United States Patent [19]

Ransmayr et al.

[11] 4,163,036
[45] Jul. 31, 1979

[54] PROCESS FOR PRODUCING MINERAL WOOL FIBERS PROVIDED WITH A BINDER

[75] Inventors: Wilhelm Ransmayr; Heinz Mally, both of Linz, Austria

[73] Assignee: Vereinigte Oesterreichische Eisen- und Stahlwerke Alpine Montan Aktiengesellschaft, Vienna, Austria

[21] Appl. No.: 836,608

[22] Filed: Sep. 26, 1977

[30] Foreign Application Priority Data

Sep. 30, 1976 [AT] Austria ................................. 7279/76

[51] Int. Cl.² ............................................. B01J 2/02
[52] U.S. Cl. ........................................ 264/12; 264/13
[58] Field of Search ....................... 264/12, 6, 121, 91, 264/13

[56] References Cited

U.S. PATENT DOCUMENTS

| 2,315,734 | 4/1943 | Richardson | 264/12 |
| 2,929,436 | 3/1960 | Hampshire | 264/121 |
| 3,671,210 | 6/1972 | Richardson | 264/12 |

Primary Examiner—Robert F. White
Assistant Examiner—James R. Hall
Attorney, Agent, or Firm—Kurt Kelman

[57] ABSTRACT

A stream of molten slag is produced. A preferably hydraulic binder powder which is compatible with the molten slag is added to the stream in a predetermined proportion therewith. The molten slag is blasted together with the binder powder added thereto to form mineral wool fibers provided with the binder. The mineral wool fibers provided with the binder are combined in a web.

4 Claims, 1 Drawing Figure

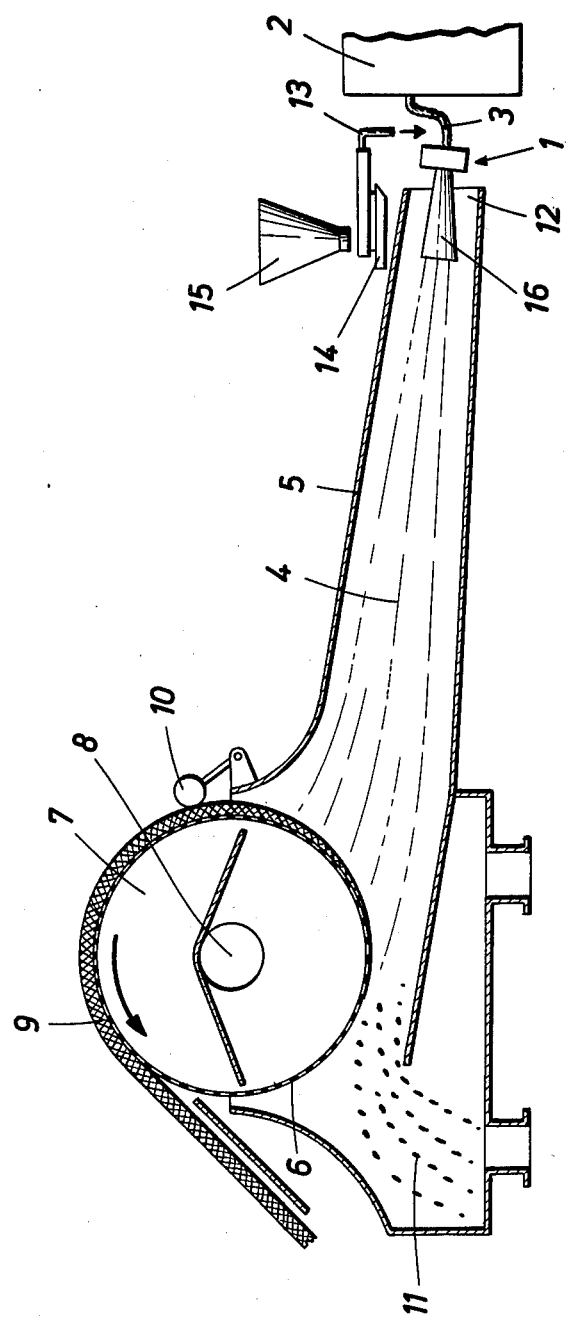

PROCESS FOR PRODUCING MINERAL WOOL FIBERS PROVIDED WITH A BINDER

This invention relates to a process for producing mineral wool fibers provided with a binder, which fibers consist particularly of slag wool fibers and are produced by blasting a stream of molten mineral material into fibers, which are then carried by means of an air stream in a free flight to a revolving receiving surface and are sucked on to the latter.

Structural parts, such as walls or floors, may be provided with a layer of bonded mineral fibers for protection against fire and for sound insulation and heat insulation. The fibers are transported to the site in a blend with a binder powder, such as cement, gypsum, magnesite, and after admixing water to that blend the same is sprayed onto the structural parts to be covered so that a solid layer is formed when the sprayed-on fibers have been bonded. The quality of such protective layer depends on the uniformity of the blend consisting of the fibers and the binder powder, i.e., on the uniform distribution of the binder adhering to the individual fibers. Because there is a trend to avoid asbestos fibers, for reasons of health, the fibers presently used in such layers consist almost exclusively of mineral wool fibers, particularly slag wool fibers, which are produced from the molten mineral in a defibrillator, which consists, of a blasting nozzle or a centrifugal wheel. The defibrillator discharges the fibers into a duct in which they are entrained by an air stream and carried by the latter in a free flight onto a perforated drum connected to a suction device so that the fibers are deposited on the drum and form a web of mineral wool, which is withdrawn from the drum. The web of mineral wool is then loosened in a suitable unit, usually a carding machine, and is fed to a blender, in which a binder powder is admixed to the loosened mineral wool. To produce a uniform, thorough blending action, the materials to be mixed are engaged and agitated by specially shaped, rotating centrifugal blades; the resulting turbulence ensures a continual engagement of the materials to be mixed and an intense blending thereof. Practice has shown, however, that the mineral wool is disintegrated in part by the impacts which result from the agitation and the highly disintegrated individual fibers bunch together to form small balls. It will be understood that this blending step prevents the formation of a protective layer consisting of long fibers and that an adhesion of the binder to the individual fibers is not ensured because a binder layer is formed substantially only on the surface of the balls of bunched fibers.

For this reason it has already been proposed to feed the binder powder to the fibers immediately after they have been formed, i.e., to feed the binder powder to the fibers which are carried by an air stream. This results in an important improvement because the long fibers are preserved and the binder is caused to adhere to the individual fibers. On the other hand, that known process has the disadvantage that an appropriate distribution of the binder cannot be obtained unless the binder is blown into the stream of fibers. Such blowing involves a need of special precautions in order to prevent an undesired disturbance of the flight path of the fibers. In spite of the expenditure which is involved, the desired uniform distribution of the binder on all fibers and throughout the length thereof cannot be achieved.

It is an object of the invention to avoid these disadvantages and to provide a process of producing mineral wool fibers provided with a binder in such a manner that the binder is uniformly applied to all mineral wool fibers whereas a special additional expenditure is not required.

In a process of the kind described first hereinbefore, this object is accomplished according to the invention in that the binder powder is added to a stream of molten mineral in a predetermined proportion thereto and is blasted together with the mineral jet.

It has surprisingly been found that the blasting of the binder and of the liquid mineral jet in a common blasting nozzle results in a fully satisfactory distribution of the binder on the fibers because binder is applied to all fibers and each fiber is provided with adherent binder throughout its length. Another advantage afforded by the joint blasting resides in that additional means for distributing the binder throughout the cross-section of the stream of fibers are not required so that optimum conditions are also provided regarding the structural expenditure.

Particularly favorable conditions will be obtained if a coupling agent, e.g. a mineral oil, is added to the stream of molten mineral material before the binder is added thereto. In that case the binder powder which is uniformly applied to all fibers will reliably adhere to the fibers during the formation of the mineral wool and during the handling thereof.

When the molten mineral material is blasted into fibers by means of a blasting nozzle, a structurally simple arrangement may be used in which the binder powder is supplied from a supply container through a proportioning device to a delivery conduit, which has an outlet opening near the inlet opening of the blasting nozzle so that the binder powder is blasted together with the molten mineral material. Practice has shown that this results in a particularly uniform covering of binder on the fibers.

Equipment for carrying out the process according to the invention is diagrammatically shown in a sectional view on the drawing.

The illustrated equipment for producing a web of slag wool comprises a blasting nozzle 1 for producing slag wool fibers 4 from a stream of molten slag 3 of high viscosity emerging from a melting furnace 2 and a duct 5, which succeeds the blasting nozzle 1 and in which a stream of fibers 4 moves from nozzle 1 in a freely flight to a receiving surface 6. In the embodiment shown by way of example, the receiving surface 6 is formed by a perforated drum 7 connected by an axial duct 8 to a vacuum source, not shown. As a result, the fibers 4 are sucked onto the receiving surface 6 and a web 9 of slag wool is formed on the perforated drum 7, which is rotated to move the web 9 into a region which is not subjected to subatmospheric pressure. A pressure roller 10 is provided to compact and guide the web of slag wool forming on the perforated drum 7 in the suction range. The fibers formed by the blasting of the slag have initially enlarged leading ends, which subsequently break off to form slag beads, which are eliminated at 11.

Binder powder contained in a supply container 15 is delivered through a proportioning device 14 and a delivery conduit 13 to the slag stream 3 which enters the blasting nozzle 1 disposed adjacent to the inlet opening 12 of the duct 5. Because the outlet opening of the delivery conduit 13 is disposed adjacent to the inlet opening of the blast nozzle 1, the binder powder is blasted in the blasting nozzle together with the stream of liquid slag 3, blasting being effected in nozzle 1 by delivering a stream of air or inert gas under pressure into the nozzle, as is conventional in blasting nozzles. This results in a particularly good and uniform distribution of the binder powder on the individual slag fibers which emerge from the mouthpiece 16 of the blasting nozzle 1. It is essential that the binder and the slag stream 3 are jointly blasted in the blasting nozzle. The exact point at which the binder is supplied to the slag stream is less important, provided that the joint blasting is ensured.

EXAMPLE

In the equipment described hereinbefore, acid blast furnace slag (38% $SiO_2$, 37% CaO, 10% MgO, 12% $Al_2O_3$, 2% MnO, balance various other oxides) was melted and at a temperature of 1400° C. was delivered as an open stream to an ejector nozzle (blast nozzle) and blasted therein, and Portland cement was continuously added to the slag stream at a rate of 17 kg Portland cement per 100 kg slag. In this way, a web of long-fiber slag wool was obtained. A microscopic examination has shown that the binder was uniformly distributed on all fibers of the slag wool web so that a firmly adhering, dense covering on structural parts can be formed in a satisfactory manner by admixing water with the slag wool and spraying the resulting mixture onto the structural parts.

It will be understood that the binder powder must be compatible with the molten mineral material to which it is added and that a hydraulic binder will be preferred.

What is claimed is:

1. A process of producing mineral wool fibers provided with a binder, which comprises
   producing a stream of molten mineral material,
   adding binder powder which is compatible with said mineral material to said stream in a predetermined proportion, and
   jointly blasting said mineral material stream containing said binder powder through a blasting nozzle to form mineral wool fibers provided with said binder.

2. A process as set forth in claim 1, in which said molten mineral material is mineral slag.

3. A process as set forth in claim 1, in which a coupling agent is added to said stream of molten mineral material before said binder powder is added thereto.

4. A process as set forth in claim 1, in which a mineral oil is added to said stream of molten mineral material before said binder powder is added thereto.

* * * * *